United States Patent [19]

Moss

[11] 4,092,531
[45] May 30, 1978

[54] IMMERSED REFLECTOR QUADRANT DETECTOR

[75] Inventor: Gaylord E. Moss, Thousand Oaks, Calif.

[73] Assignee: Hughes Aircraft Company, Culver City, Calif.

[21] Appl. No.: 742,317

[22] Filed: Nov. 16, 1976

[51] Int. Cl.² .............................................. H01J 3/14
[52] U.S. Cl. .............................. 250/216; 250/203 R; 350/293
[58] Field of Search .................... 250/203, 209, 216; 356/141, 152; 350/103, 104, 293, 294, 303

[56] References Cited

U.S. PATENT DOCUMENTS

| | | | |
|---|---|---|---|
| 3,478,219 | 11/1969 | Nutz | 250/203 R |
| 3,654,475 | 4/1972 | Montpas | 250/203 R |
| 4,015,120 | 3/1977 | Cole | 250/216 |

Primary Examiner—David C. Nelms
Attorney, Agent, or Firm—Donald C. Keaveney; W. H. MacAllister

[57] ABSTRACT

There is disclosed a quadrant detector which is characterized by an optical reflector immersed in a high refractive index material to increase the field of view of the detector. The immersed reflector divides the incoming radiation and directs varying portions of this radiation to four separate immersed detectors. The device thereby achieves an increased field of view for proportional operation of a quadrant detector. The high index material reduces the spread of the incoming rays and the ray bundles can then be collected by a much smaller detector than would be required by a conventional quadrant detector with the same field of view. Sensitivity is increased and the need for gimbals is often eliminated.

9 Claims, 16 Drawing Figures

IMMERSED REFLECTOR QUADRANT DETECTOR

BACKGROUND OF THE INVENTION

Quadrant detectors have been used for many years as direction finding devices in tracking systems and the like. The name "quadrant", of course, implies that the four adjacent quadrants of a circular detector subtending the entire field of view each comprise a separate radiation detector. If radiation from a point source is falling on the array of four quadrant detectors from a given angle whether on or off the viewing axis orthogonal to the plane of the detectors, the basic algebra by which the signals from the four quadrant detectors can be processed to determine the angular direction of the point source with respect to the plane of the quadrant detectors and its central viewing axis is well known in the art.

A simple quadrant detector may be provided with an objective lens. It is then found that the system has a limited field of view which depends in part on the detector size, as is shown in greater detail in FIG. 1. In order to increase the field of view, one must increase the detector size. In the usual system, however, one quickly finds that this method of increasing the field of view soon becomes impractical. The reason is that as one increases the detector size, the detector capacitance also increases and the detected signals, which are usually pulses, tend to disappear. Some other means must be found to increase the field of view. Commonly, the solution employed is to gimbal the narrow field of view detector with an appropriate gimbal scan search mode to acquire the desired target. After lock-on is achieved, the narrow field of view quadrant detector is used to track the target. This is obviously a complex, expensive solution. It would be far preferable to find a quadrant detector configuration which increases the field of view for a given detector size.

Holographic field lens reflectors have been used for this purpose. These are better than conventional quadrant detectors, but still do not achieve the field of view and detection efficiency attainable by the present invention.

Simple hemispherical single immersion lenses at a detector plane have also been used in the past to partially increase the field of view of a detector. Reference is made to a book entitled, "Modern Optical Engineering" by Warren J. Smith, published by McGraw Hill Book Company in 1966. At page 230, paragraph 9.7 describes radiometers and detector optics and on page 233 the typical arrangement of a single hemispherical immersion lens in a detector system between the detector and the objective lens is illustrated and analyzed.

It is an object of the present invention to provide a quadrant detector configuration which more nearly reaches the theoretical maximum field of view for a given detector size and which gives even greater field of view improvement than does the single hemispherical immersion lens system or the holographic field lens reflector.

BRIEF DESCRIPTION OF THE DRAWINGS

These and other objects, advantages and features of the invention will be more fully apparent from the detailed description below taken in conjunction with the accompanying drawings in which like reference characters refer to like parts throughout and wherein.

DETAILED DESCRIPTION OF THE INVENTION

Figure 1:
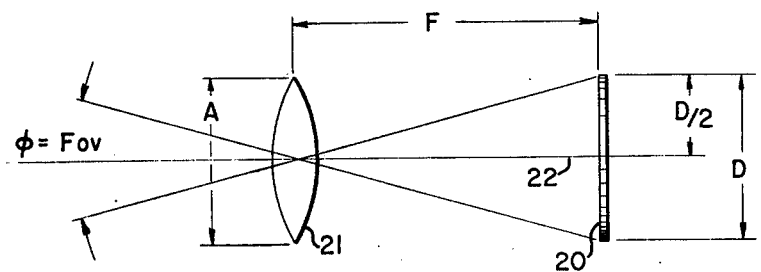
FIG. 1 is a schematic drawing illustrating the problem of limitation of field of view existing in the prior art.

In FIG. 1 there is shown a simple quadrant detector 20 positioned on an optical axis 22 with objective lens 21 in accordance with common practice in the prior art. Lens 21 is spaced a distance F (equal to the focal length of the lens) from the detector 20 along the optic axis 22. Detector 20 has a diameter D and lens 21 has diameter A. The field of view angle $\theta$ is illustrated in the figure and is shown in the literature to be equal to twice the angle whose tangent is equal to D divided by 2F. F in turn is obviously equal to A times the focal number of the system by simple algebra and the definition of the focal number.

In order to increase the field of view, $\theta$, one must increase the detector size, D. In the usual system, however, one quickly finds, as noted above, that this method of increasing the field of view soon becomes impractical since as one increases detector size, the detector capacitance also increases. This causes the detected signals, which are usually pulses, to tend to disappear. If one does not wish to gimbal the detector lens system, some other means must be found to increase the field of view.

Figure 2:
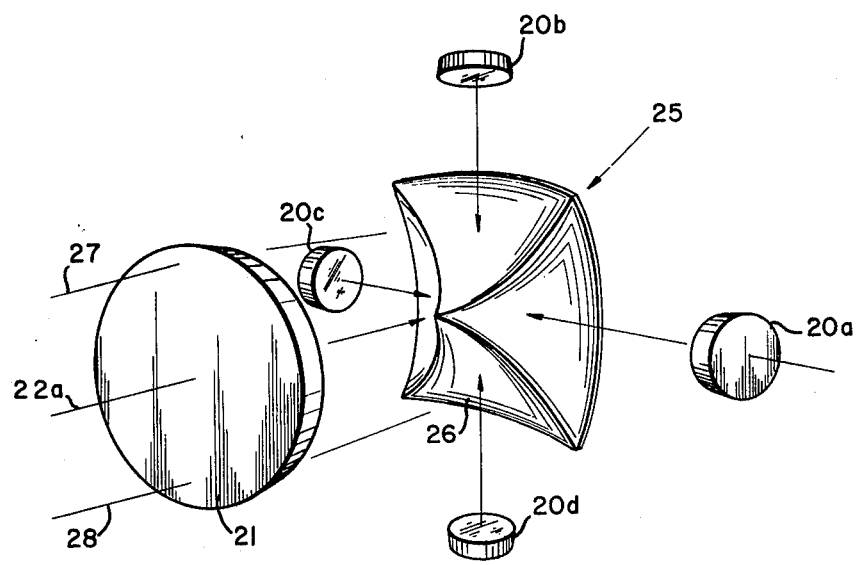
FIG. 2 is a schematic view illustrating one possible step toward a solution of this problem.

As a first approach to a wide field of view quadrant detector, consider the arrangement shown schematically in FIG. 2. The surface of reflector 25 is designed so that the energy from the objective lens 21 is divided and varying portions of this energy are reflected onto four detectors, 20a, 20b, 20c, and 20d positioned on orthogonal axes which intersect in a plane perpendicular to the optic axis 22a which in turn is orthogonal to the back plane of the reflector surface and intersects it at its central elevated peak 26. The reflector 25 is symmetrical about the optic axis, each quadrant being shaped to act as a reflector for one of the individual detectors positioned peripherally around the reflector. It will be seen that the proportion of the energy received from the objective lens which is reflected on to each of the detectors depends on the angle which the direction line of the incoming radiation makes with the optic axis 22a, and thus one has a quadrant detector device. As shown, the rays 27 and 28 of the incoming radiation are parallel with the optic axis 22a so that equal portions of the radiation will be reflected to each of the detectors.

Unfortunately, one finds that however cleverly one tries to design the reflecting surface 25, the detectors required to intercept the radiation over the full field of view are nearly as large as for a simple quadrant detector with the same field of view. This approach, with a reflector in air, is defeated by the wide divergence of the rays in the cone of light rays coming from the objective lens. This cone must be reduced to reduce the detector size. Such a reduction has already been achieved in the prior art in certain simple configurations as discussed by the above-noted textbook by Warren J. Smith by the use of so called immersion lenses which serve to refract the incoming radiation before it reaches the detector. In the past, however, there has been no known way of combining such an immersion lens with the desirable type of reflector shown in FIG. 2.

Figure 3:
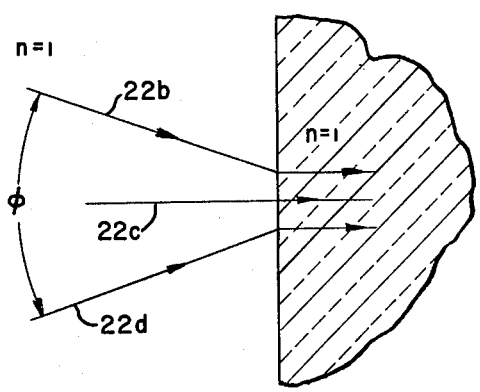
FIG. 3 is a schematic diagram illustrating the nature of the light refraction utilized.

FIG. 3 illustrates diagrammatically the manner in which an immersion lens can be used to make a success of the reflector quadrant system of FIG. 2. Notice that when the cone of rays, 22b, 22c, 22d, defining a field of view angle $\theta$ strikes the immersion lens material 29 having an index of refraction $\eta$ which is greater than one (as contrasted to the index of refraction of the material such as air through which the rays pass to enter the lens which material has an index of refraction equal to one) the total ray divergence is reduced by the well known law of refraction at the interface surface between the materials. One may profitably view the inside of the higher index material as a new world in which the divergence of the cone of rays is less than in the outside world. One can now see that it is possible to build a reflector with associated detectors in this new lower cone divergence world and have, for a given detector size, a much larger field of view system than in air.

An immersed four quadrant reflector system has been constructed in glass having an index of refraction of 1.5 in the manner illustrated in FIGS. 4-9. For ease of fabrication, the reflector surfaces were made spherical since approximately 80% of the performance of parabolic surfaces is retained by spherical surfaces. In FIGS. 10-13 the calculated characteristics of a similar system having parabolic rather than spherical surfaces are illustrated.

Figure 4:
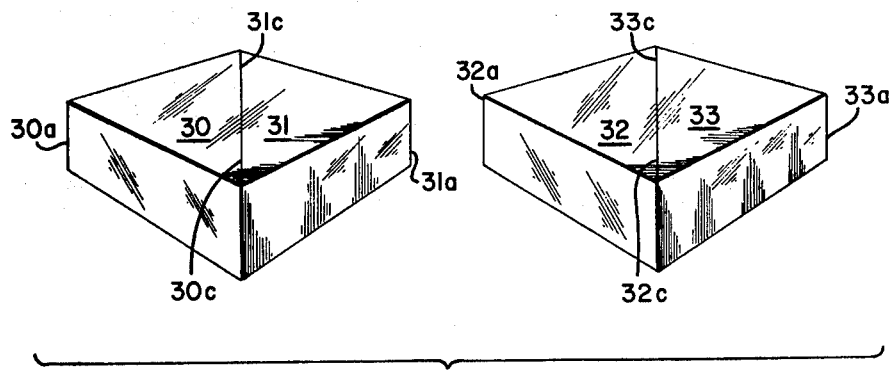
FIGS. 4, 5 and 6 are perspective views illustrating the steps in the preferred method of manufacture of the optical elements of the present invention.
Figure 5:
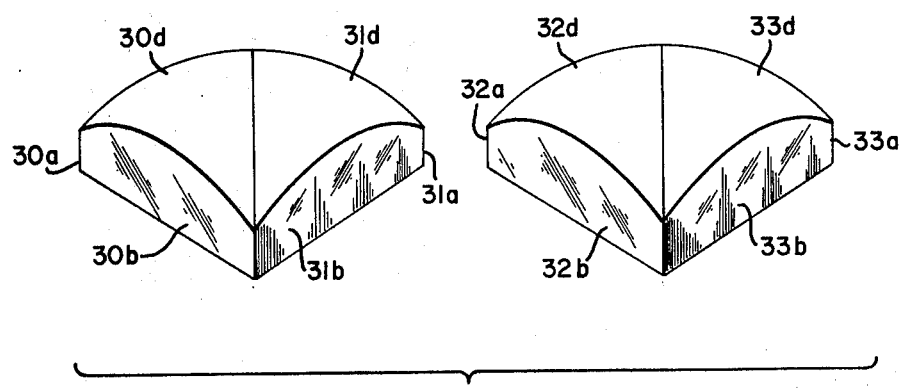
Figure 6:
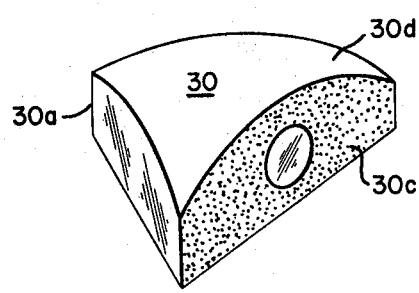
Figure 7:
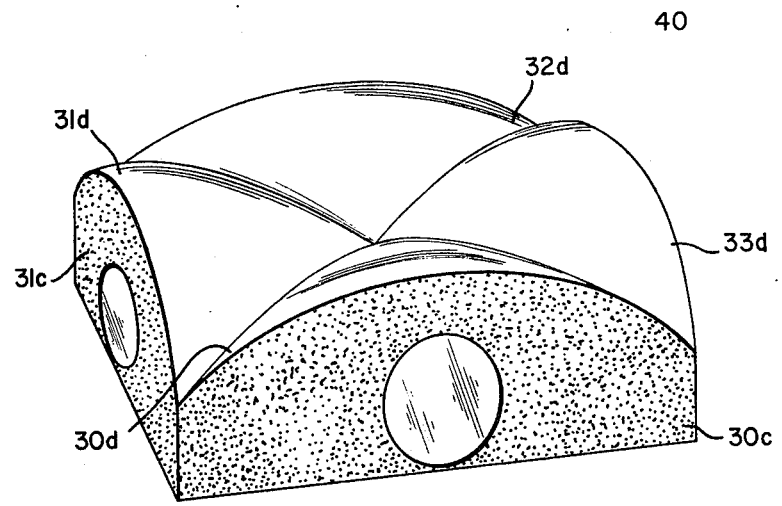
FIGS. 7 and 8 are perspective views from two different angles of the optical element of the present invention, the latter also showing the positioning of the detectors.

FIGS. 4, 5 and 6 are perspective views showing the manner in which the reflector element shown in the perspective view of FIG. 7 is fabricated. It will be seen from FIG. 4 that the fabrication process starts with four identical prisms 30, 31, 32 and 33. In FIG. 4 the 45°-45°-90° prisms 30 and 31 have been shown with their long faces cemented together with optical cement. Similarly, the identical prisms 32 and 33 have had their long faces joined by optical cement. Each of the prisms has a 90° angle as at the corners 30a, 31a, 32a and 33a whereas the other angles are each 45° so that when cemented together the top surface has a square outline.

The next step is shown in FIG. 5 and comprises optically grinding the top surface of each of the two assemblies shown in FIG. 4 in whatever reflecting shape is desired for the ultimate reflector surfaces. In FIG. 5 this surface is shown as being a portion of a spherical surface so that the reflecting surfaces in the illustrated device shown in FIGS. 7 and 8 become spherical segments.

In an exemplary device each prism had a thickness of 0.550 inches, short edges of 1.0 inch and a long edge of 1.414 inches. The radius of curvature of the spherical surface ground on each pair of prisms was 0.956 inches.

Once the surfaces have been ground, the optical cement holding the initial prisms together is melted or dissolved permitting separation of the now ground prisms 30b and 31b and 32b and 33b to produce four quadrant elements of the type shown in FIG. 6. This results in four prisms each of which has one right angle (as at 30a) and each of which has a top surface ground to a portion of a sphere.

Figure 8:
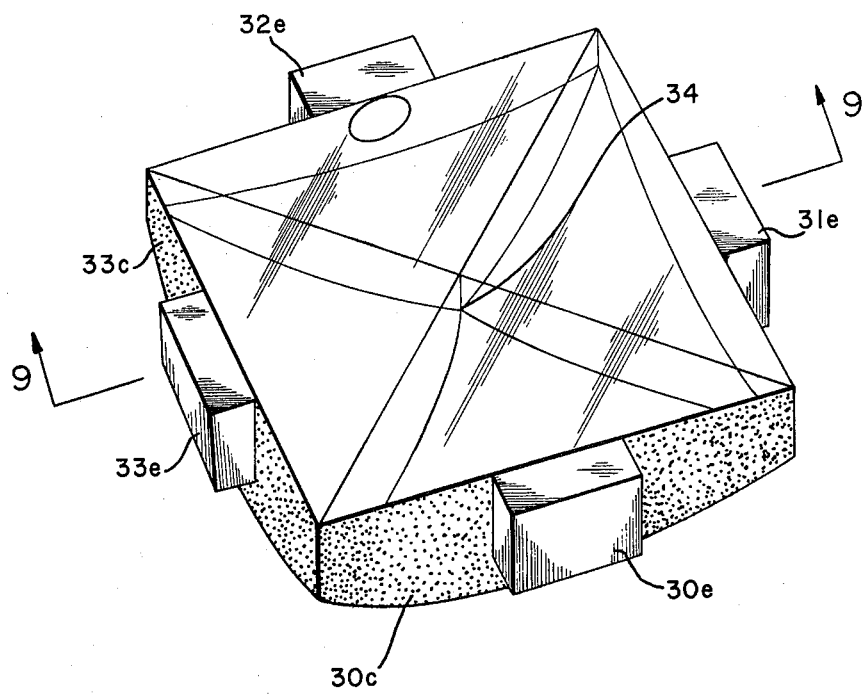

The four ground prisms are then reoriented with respect to each other so that the four right angles are brought together at a central point 34 in the reflector device 40 shown in FIGS. 7 and 8, as best seen in FIG. 8. The long sides of each of the prisms which had been originally cemented together will now form the outer edges of the newly assembled reflector element. Since these edges form the surfaces 30c, 31c, 32c and 33c as seen from a comparison of FIG. 4 with FIGS. 7 and 8, the four right angle corners 30a, 31a, 32a and 33a meet at the central point 34 of the square reflector element shown in FIG. 8.

Of course it will be realized that in commercial practice a prototype would be made as described above from which in turn a mold is made to permit injection casting of the device. Aternatively, a die can be made for ultrasonic machining noncastable materials.

FIG. 7 shows the resulting four top surfaces in perspective in the same relative top and bottom relationship as is shown in FIGS. 4, 5, and 6. These top surfaces 30d, 31d, 32d and 33d, are then coated with a reflective material such as mirror silvering so that the inner surface will become reflective.

In FIG. 8 the device 40 of FIG. 7 is shown inverted so that from a perspective angle one is looking into the reflective surfaces in an off-axis fashion. As seen in FIGS. 6 and 8, each of the four sides 30c, 31c, 32c and 33c is coated with black tape or other absorptive material except at a small aperture through which light is transmitted to a detector, one of which is mounted on each of the four sides as at 30e, 31e, 32e, and 33e. The detectors are of course centrally and symmetrically positioned so that a vertical plane passing through the centers of detectors 30e and 32e or 31e and 33e will also pass through the central peak point 34 at which the four corners 30a, 31a, 32a and 33a meet.

Figure 9:
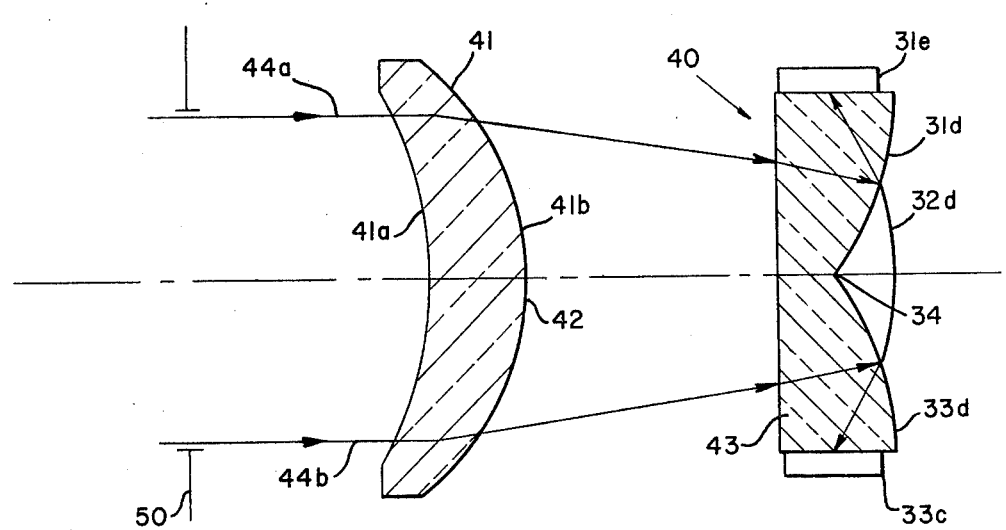
FIG. 9 is a sectional schematic view of the assembled system in accordance with the present invention utilizing the optical element of FIGS. 7 and 8 and taken on the line 9—9 of FIG. 8.

In FIG. 9 there is shown a diagrammatic sectional view through the central point 34 taken on line 9—9 extending along the axis between detectors 31e and 33e of the assembled immersed reflector quadrant detector 40. The objective lens 41 is positioned on an optic axis 42 which also passes through the central point 34 of the immersed reflector quadrant detector 40. The plane light receiving lower surface 43 of the element 40 is positioned orthogonally to the optic axis 42. Incoming radiation which may be of any wavelength of interest whether visible infrared or the like is represented by its outer rays 44a and 44b. In FIG. 9 this bundle of rays is shown to be parallel to or coaxial with the optic axis 42 so that the total received radiation will be equally divided by the reflecting surfaces 30d, 31d, 32d, and 33d between the four respectively associated detectors 30e, 31e, 32e, and 33e. In an exemplary device operating in the visible wavelength region, the focal length of objective lens 41 was 69 millimeters and the distance from the surface 41b of the objective lens to the surface 43 of device 40 was 14.9 millimeters. The radius of surface 41a of meniscus lens 41 is 16.7954 inches and the radius of surface 41b is 1.2290 inches. A one inch diameter circular aperture 50 was placed 7 millimeters in front of surface 41a. The thickness of lens 41 between surfaces 41a and 41b was 12.5 millimeters at the center or optic axis.

Figure 10:
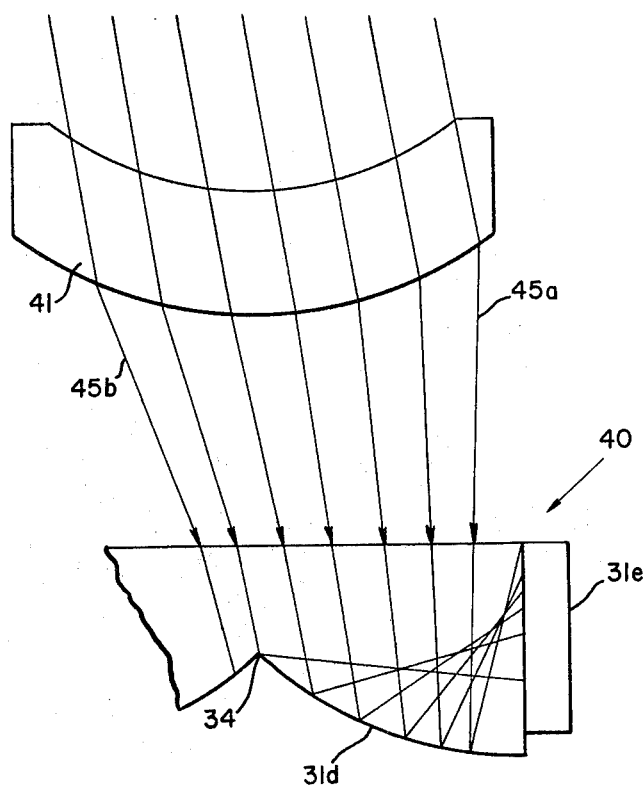
FIG. 10 is a sectional view on an enlarged scale of a portion of the system of FIG.9 illustrating the manner in which optical ray paths achieve the increased field of view desired.

If the incoming radiation is at an angle to the optic axis 42, the action will be as shown in FIG. 10 which is a diagrammatic view illustrating the relationships to only the single detector 33e by way of example. In this example shown in FIG. 10, the solid rays 45a and 45b are calculated for an off-axis angle of +12.5° for the above objective lens 41 of 69 millimeters focal length. The refractive index for the glass from which the immersed reflector element 40 is formed is chosen to have a value of 1.51. For the purposes of this example, the reflective surfaces such as 33d are illustrated as being spherical as noted above. The total required area of all four detectors is then 175MM$^2$ in order to collect all the radiation. For comparison, the required area of a simple quadrant detector is 700MM$^2$. The immersed reflector system thus increases signal voltage by a factor of 4 and the detected power by a factor of 16 or 12 decibels. The detector used is shown as having a diameter of 8.3 millimeters. If the detector is sloped at an angle to the surface on which it is mounted, a smaller diameter will intercept the same cone of radiation.

Figure 11:
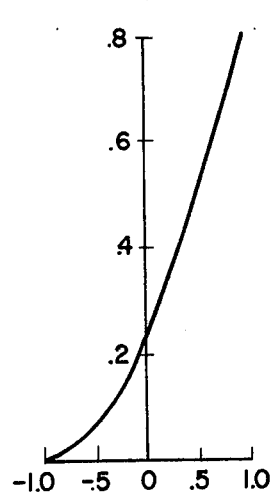
FIGS. 11, 12 and 13 are graphs illustrating the transfer characteristics of the system of FIGS. 9 and 10 for three different scan patterns of the input beam.
Figure 11A:
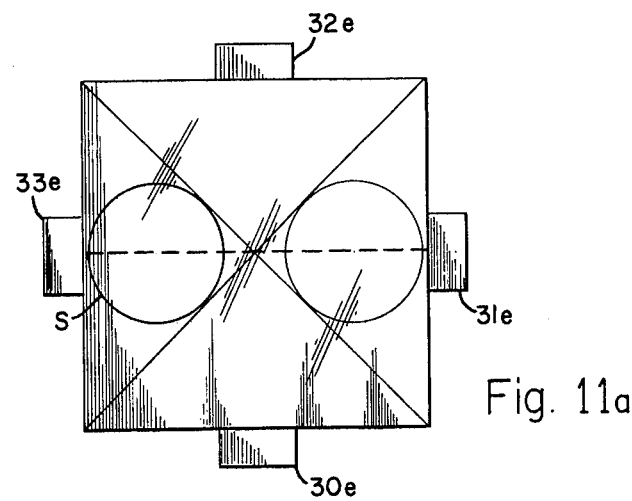
FIGS. 11a, 12a and 13a are diagrammatic representation of the respectively associated scan pattern for FIGS. 11, 12 and 13.
Figure 12:
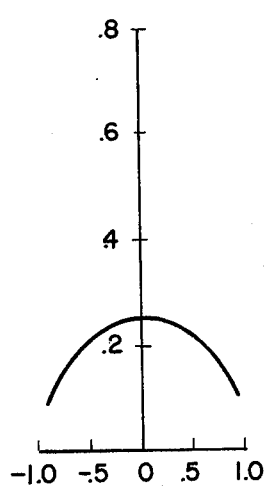
Figure 12A:
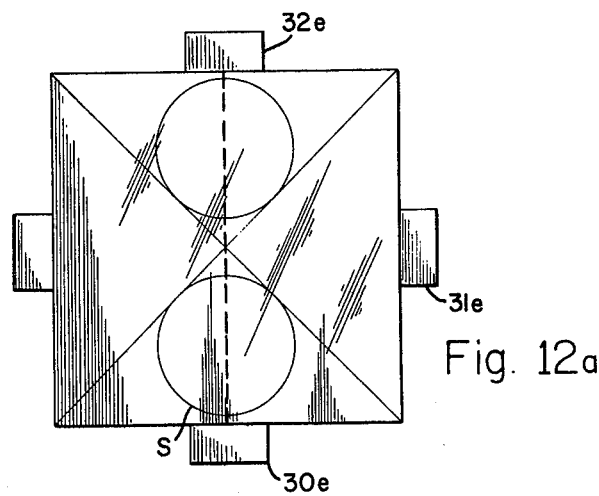
Figure 13:
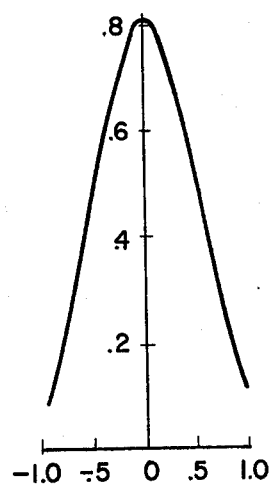
Figure 13A:
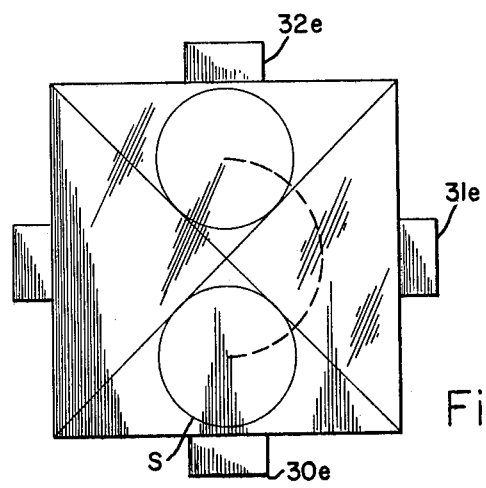

The analytical transfer function curves of the immersed reflector quadrant detector defined in the diagrammatic view of FIGS. 9 and 10 are shown in FIGS. 11, 12 and 13 respectively for three conditions of angular scan illustrated in FIGS. 11a, 12a, and 13a.

In FIGS. 11, 12, and 13, the normalized voltage output V of detector 31e is plotted as ordinate and distance along the associated scan pattern in normalized units is plotted as abscissa. FIGS. 11a, 12a and 13a are plan view diagrammatic representations of the device 40 oriented as seen in FIG. 8. In FIG. 11a, an input light spot S moves along what may be referred to as the X axis between detectors 33e and 31e starting entirely within quadrant 33 and ending in quadrant 31. The resulting voltage output is seen in FIG. 11. A similar procedure is used to obtain FIG. 12 from the scan of FIG. 12a and FIG. 13 from FIG. 13a. In FIG. 12a the scan of spot S is along the Z axis between detector 30e and 32e. Again, the output of detector 31e is plotted. In FIG. 13a, the scan of spot S is along a semicircular path from quadrant 30, through quadrant 31 and then fully in to quadrant 32. The achievement of these desirable transfer functions has not heretofore been possible by other known means for which the immersed quadrant detector of the present invention can be a plug-in replacement in many complex systems.

What is claimed is:

1. A wide field of view quadrant detector for providing four output signals each of which is proportional to the intensity of radiation in one quadrant of an image projected onto said device comprising:
   a. four separate optical detectors of which one is associated with each of said quadrants;
   b. optical reflector means immersed in a high refractive index transparent material, said material having a first surface shaped and positioned for receiving said projected image from a lower refractive index medium and for refracting and transmitting said image to a second surface of said transparent material along a first optic axis;
   c. said second surface of said material being divided into four quadrants, each of said quadrants of said second surface being a portion of a surface of revolution, all of said quadrants of said second surface meeting at a common intersection point which lies on both said first optic axis and said second surface;
   d. said reflector means being formed on all of said quadrants of said second surface for dividing said projected radiation in said image by reflecting that portion of it which falls on the reflector means on each of said second surface quadrants toward an associated one of said detectors along an optical path which lies within said high index of refraction material, each of said reflector means being shaped and positioned to direct the radiation which falls on its quadrant only toward its associated detector.

2. A device as in claim 1 wherein said first surface is a planar surface.

3. A device as in claim 2 wherein each of said quadrants of said second surface is a portion of a spherical surface.

4. A device as in claim 2 wherein each of said quadrants of said second surface is a portion of a parabolic surface.

5. A device as in claim 2 wherein said high refractive index transparent material is an optical glass having an index of refraction in the range between 1.5 and 2.0.

6. A device as in claim 1 wherein said first surface is a planar square, said second surface being divided into said four quadrants by the orthogonal projections of the intersecting diagonals of said planar square.

7. A device as in claim 6 in which one of said four optical detectors is positioned on each of the edge surfaces of said device delineating said planar square surface.

8. A device as in claim 7 wherein each of said detectors has its surface positioned orthogonally to said planar square surface.

9. A device as in claim 7 wherein each of said detectors has its surface positioned at an acute angle with respect to the normal to said planar square surface interiorally of said device.

* * * * *